United States Patent [19]

Berstein

[11] Patent Number: 4,558,211

[45] Date of Patent: Dec. 10, 1985

[54] TRANSACTION TERMINAL SYSTEM

[75] Inventor: Patrick Berstein, Thornhill, Canada

[73] Assignee: Imperial Oil Limited, Toronto, Canada

[21] Appl. No.: 497,061

[22] Filed: May 23, 1983

[51] Int. Cl.$^4$ ............................................... G06K 5/00
[52] U.S. Cl. ................................. 235/380; 340/825.33
[58] Field of Search ....................... 235/379, 380, 381; 340/825.33

[56] References Cited

U.S. PATENT DOCUMENTS 3,394,246 7/1968 Goldman .............................. 235/380
4,319,336 3/1982 Anderson et al. ................ 235/380 X Primary Examiner—David L. Trafton
Attorney, Agent, or Firm—Ridout & Maybee

[57] ABSTRACT

In a transaction terminal system including a central computer and a number of remote intelligent terminals in intermittent communication with the central computer, the central computer periodically updates local hot card files at the terminals from a master hot card file. Hot card data stored at the central computer includes additional data indicative of the likelihood of a particular hot card being presented in a particular locality such that this additional data can be used to select subsets of hot card data for downloading to individual terminals, the subsets including data on hot cards deemed most likely to be presented in the locality of each terminal concerned.

4 Claims, 1 Drawing Figure

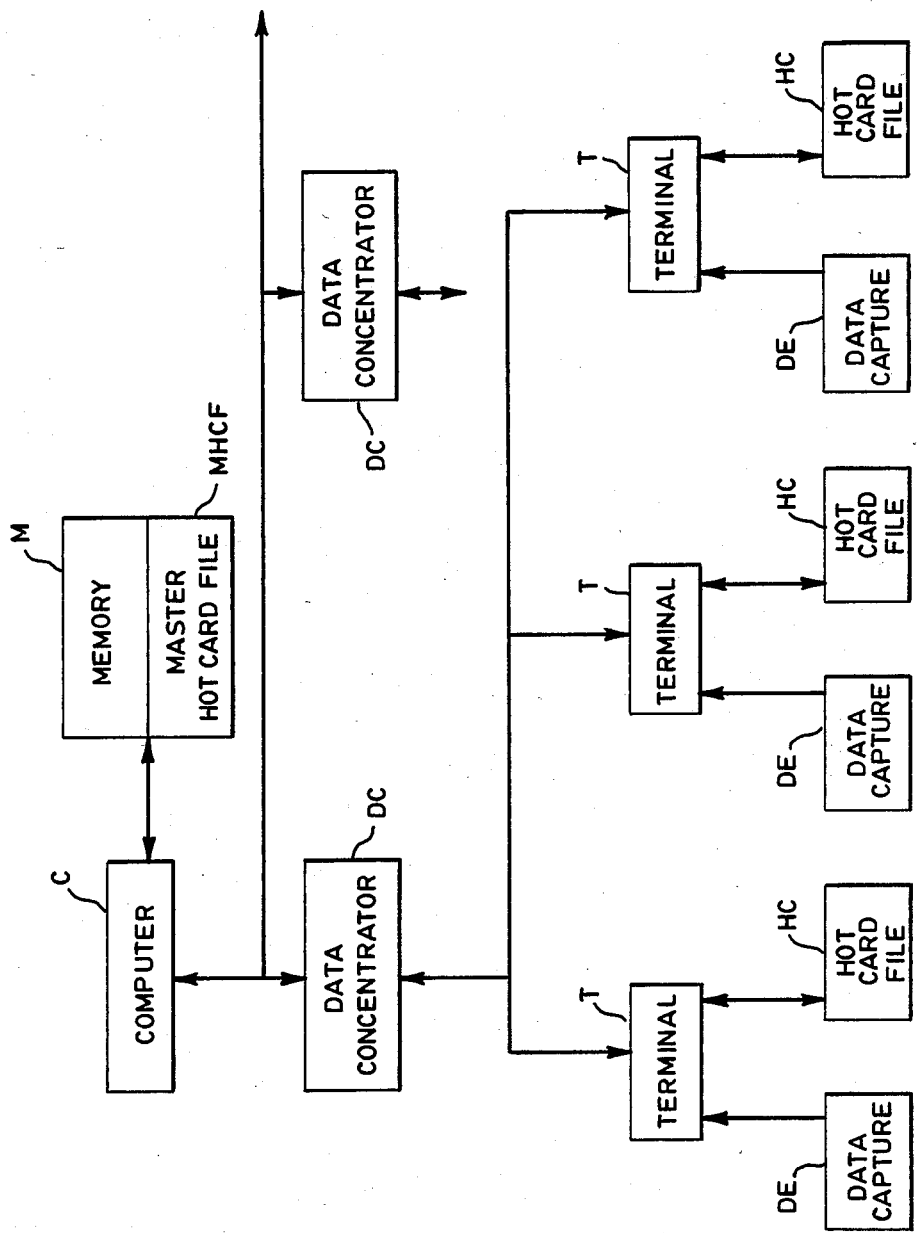

TRANSACTION TERMINAL SYSTEM

FIELD OF THE INVENTION

This invention relates to transaction terminal systems in which credit cards are utilized to authorize transactions at individual terminals.

BACKGROUND OF THE INVENTION

It is well known that in such systems, a substantial problem arises through the tendering of stolen, delinquent, void or counterfeit cards (generally known as "hot" cards) to authorize transactions. The usual method of control is to verify card data against a file listing data pertaining to hot cards. When carried out by visual verification of card data against a printed list, this procedure is slow and subject to human error, whilst it is difficult to maintain adequate updating of the lists. It is therefore attractive, where electronic terminals are used, to maintain an electronic hot card file in a frequently updated memory accessible to the terminal so that the verification may be carried out electronically, the card data being in any case required to be entered either by keyboard or by a card reader in order to authorize the transaction.

One problem with this approach is the size of the hot card files often required. The provision of adequate memory at individual terminals is often either unduly expensive or impracticable; the use of systems such as that disclosed in U.S. Pat. No. 4,114,140 issued Sept. 12, 1978 to Kubina is only practical when the number of different cards to be verified is reasonably small, as where cards are issued only on a restricted class of persons. It is not suitable for example where major credit cards having national or international circulation are involved. Even the improved system disclosed in U.S. Pat. No. 4,296,404, issued to Sheldon on Oct. 20, 1981, suffers this same failing, though the local memory is periodically updated by communication with a central computer. Provision of the necessary memory at a central supervisory computer involves either continuous on-line access to the central computer or at the least excessive communications costs and tiresome delays if the terminals are remotely located and have to access the central computer each time a transaction is to be verified. Systems such as that disclosed in U.S. Pat. No. Re. 30,821 (Goldman) are only really practical when the terminals are concentrated in a fairly small area, or a dedicated communications network is already available.

One approach to this problem is to carry out a local test of the data presented to a terminal to determine whether the card is void or central verification of a particular transaction is required. This may be done either by setting a limit on the size of a transaction, above which central verification is required, or by more sophisticated means as described in U.S. Pat. No. 3,566,091 issued Feb. 23, 1971 to Goldman, and U.S. Pat. No. 3,740,530 issued June 19, 1973 to Hoffer et al. Such systems can detect cards which are self-evidently expired or otherwise void, and will limit the loss on any particular transaction, but will not identify cards which are stolen or are associated with delinquent accounts.

SUMMARY OF THE INVENTION

An object of the present invention is to provide a system which should be effective to detect a majority of transactions involving hot cards and to limit losses due to the use of such cards, without requiring either excessive local memory capacity or excessive access to a central computer or data processing system.

According to the invention a transaction terminal system comprises a plurality of intelligent transaction terminals each comprising a data store and means for capturing transaction information and data relating to credit cards presented to authorize transactions, and a central data processing system including a data store accessible by said terminals on an intermittent basis for downloading of data relating to transactions and stored in said terminal data stores and updating of other data stored in said terminal data stores, a master hot card file forming part of the central processing system data store and organized to store data identifying hot cards together with data indicative of the likelihood of a hot card being presented in a particular location, local hot card files forming part of the data store of each of said terminals and organized to store data identifying hot cards, said local hot card files being of substantially smaller capacity than said master hot card file, means associated with each terminal to compare data captured from a card by said capture means with data stored in its local hot card file and to respond to detection of a hot card, and the central processing system being configured intermittently to review data stored in the master hot card file to identify subsets of hot cards most likely to be presented in particular localities, and to download data from such subsets to update the local hot card files of terminals located in those localities.

The above invention is predicated upon the realization that whilst the total number of hot cards which may be presented to, say, a particular gas station which accepts several different major credit cards, may be very large indeed, the number of such cards circulating in a particular restricted locality at any one time will be very much smaller, and therefore a local hot card file can be maintained at a terminal identifying those hot cards most likely to be presented at that location. There will of course be a few occasions when the users of such hot cards will travel extensively, or where a stolen card will be first used in a location remote from where it was stolen, but such transactions will normally only be a minority, at least in the case of cards used for relatively small transactions such as obtaining fuel at service stations, and other relatively small purchases. Small transactions are just those in which hot cards are normally least likely to be detected since such transactions are not large enough to justify lengthy or expensive verification procedures.

The invention also extends to such a system in which the central processing system is configured to compare data captured from cards by the terminals and downloaded thereto with data stored in the master hot card file whereby to detect transactions involving the use of hot cards, and to respond to detection of such a transaction by updating the data contained in the hot card file relating to that card to indicate a high probability of the card being used in the locality of the terminal from which the card data was captured.

SHORT DESCRIPTION OF THE DRAWINGS

The single figure of drawings is a block diagram of a system in accordance with the invention.

DESCRIPTION OF THE PREFERRED EMBODIMENT

It is a particular advantage of the system of the invention that it may be implemented by relatively minor modifications of known hardware and software. Indeed, a good understanding of the invention may be obtained by considering the disclosure of the Sheldon U.S. Pat. No. 4,296,404 (the disclosure of which is herein incorporated by reference) and pointing out the important respects in which the system of the present invention differs therefrom. That patent discloses the use of terminals, as shown in block form on the right hand side of FIG. 1, incorporating a transaction verification memory 17. Similarly the terminals T of the present invention incorporate random access memory HCF assigned to storage of data forming a hot card file. The nature of the data stored is however different. The memory 17 of Sheldon has a location or cell allocated to each card which may be used in the Sheldon system, which cell stores the status of that card. Such an arrangement is not satisfactory when the number of cards which may theoretically be presented can run into many millions, and thus the present system only stores data relating to specific subsets of hot cards, the size of the hot card file being limited to suit the capacity of memory HCF. As compared to the Sheldon system, this entails storage for each file entry of sufficient data to identify any specific card within the class or classes acceptable to the system. Thus 4K bytes of RAM will typically provide storage for over 800 hot numbers assuming that 9 digits of the account number are required to identify a card unambiguously. Instead of entry of a card number causing a check of the status of a particular memory location, the relevant group of digits in the number will be checked for parity with any of the groups of account number digits stored in the hot card file.

Entry of a card number into the system may be by any conventional data capture device DE, usually either a keypad or a card reader adapted to read encoded information from a magnetic stripe or other means incorporated in the card. Whilst it is particularly preferred that the transaction terminals employed in the system are as described in my copending application Ser. No. 455,044, filed Jan. 3, 1983, any intelligent transaction terminal may be utilized which is capable of stand alone operation, is capable of receiving and downloading information periodically over a communications link, and has memory capacity and programming capability to operate a hot card file as outlined above. Both the concept and the implementation of such a file are well known in the art, and further description is believed superfluous. The terminals may communicate with a host computer or central processing system C in a similar manner to that described in the Sheldon patent mentioned above, in order that the hot card file in each terminal may periodically be updated. In practice, it is preferred that such communications conform to the American National Standard for Interchange Message Specifications for Debit and Credit Card Message Exchange Among Financial Institutions (ANSI X9.2-1980).

Unlike the Sheldon system, in which the memory 17 of each terminal will be similarly updated since each transaction verification memory will include a status register for all possible card numbers, the terminals in the present system will require individualized hot card file updating. The host computer C will be associated with a master hot card file MHCF, forming part of a memory M and updated at suitably frequent intervals so as to list all known hot cards which may be presented. The data stored in the master hot card file in respect of each hot card will however include, in addition to the appropriate identifying digits, a further code containing data enabling assessment of the likelihood of its being presented in any particular area. The construction of this code will be a matter of choice based on experience and statistical evidence, and forms no part of this invention. It will however take into account such factors as the location in which a card was lost or stolen, or last used, and the time which has elapsed since such an event, and will thus provide criteria to enable the computer to select and update for a particular transaction terminal a subset of hot card data which is short enough to be accommodated by the memory HCF but which includes the numbers of those hot cards deemed at each updating most likely to be presented at that location. The central computer will also compare the numbers of cards listed in transaction data periodically dumped to it by the transaction terminals, and will compare these with the master hot card file. If a card appearing in the master file is identified as having been used in a transaction at any particular terminal, its code will be checked and if necessary altered so as to ensure that it is added to or retained in the hot card files of terminals in that area at the next update. Thus a hot card may not be detected the first time it is used in an area, but it should be detected if it is used again after the next update of the local hot card files by the host computer. Updating of the local hot card files may involve either merely periodic updating of the file by amending card data stored in the local hot card files, involving changing the card data only at specific memory locations, or erasure of the existing file and writing in of a replacement file. The former method is quicker, but the latter avoids the accumulation of errors. If a card is confirmed as having been captured, it can of course be removed from all of the hot card files.

A system incorporating a large number of terminals dispersed over a large area may make use of a hierarchical structure in which several terminals in an area communicate with a data concentrator DC, which in turn communicates with the central computer. Systems structured in this manner are well known in the art. When used in conjunction with the present invention, they may provide a means for providing an enlarged local card file. If the terminals connected with a data concentrator can access each other's memories via the data concentrator, the part of a hot card file may be distributed between the terminals in the group so as to provide an extended file without the necessity for reference to the master hot card file via the host computer. Assuming that the terminals in a group are in the same locality, this will at least reduce the necessity for long distance communication.

The use of the system of the invention does not interfere with the use of other means of card verification. For example, terminals may be programmed to interrogate the master hot card file at the host computer when certain classes of transaction are involved, or certain classes of card, or upon any other basis which the terminals can be programmed to execute.

The term "credit card" has been used for convenience in the foregoing description. It should be understood to include debit cards and other forms of card, badge or document which may be used as a basis for authorization or validating transactions and which include a unique identification which may be captured by a transaction terminal.

I claim:

1. A transaction terminal system comprising a plurality of intelligent transaction terminals each comprising a data store and means for capturing transaction information and data relating to credit cards presented to authorize transactions, and a central data processing system including a data store accessible by said terminals on an intermittent basis for downloading of data relating to transactions and stored in said terminal data stores and updating of other data stored in said terminal data stores, a master hot card file forming part of the central processing system data store and organized to store data identifying hot cards together with data indicative of the likelihood of a hot card being presented in a particular location, local hot card files forming part of the data store of each of said terminals and organized to store data identifying hot cards, said local hot card files being of substantially smaller capacity than said master hot card file, means associated with each terminal to compare data captured from a card by said capture means with data stored in its local hot card file and to respond to detection of a hot card, and the central processing system being configured intermittently to review data stored in the master hot card file to identify subsets of hot cards most likely to be presented in particular localities, and to download data from such subsets to update the local hot card files of terminals located in those localities.

2. A system according to claim 1, wherein the central processing system is configured to compare data captured from cards by the terminals and downloaded thereto with data stored in the master hot card file whereby to detect transactions involving the use of hot cards, and to respond to detection of such a transaction by updating the data contained in the hot card file relating to that card to indicate a high probability of the card being used in the locality of the terminal from which the card data was captured.

3. A system according to claim 1, in which the transaction terminals are arranged in groups including a common data concentrator through which the terminals in the group communicate with the central processor, and wherein the data concentrator permits any terminal to request any other terminal in the group to search its hot card file for data relating to a particular card.

4. A system according to claim 1, in which the means at a terminal for capturing credit card data is a credit card reader.

* * * * *